United States Patent [19]

Purello

[11] Patent Number: 4,930,491
[45] Date of Patent: Jun. 5, 1990

[54] PORTABLE COMBINATION COOKING GRILL

[76] Inventor: Alfred C. Purello, 114 Greenleaf Dr., Newtonville, N.Y. 12128

[21] Appl. No.: 312,473

[22] Filed: Feb. 21, 1989

[51] Int. Cl.⁵ .......................................... F24C 15/16
[52] U.S. Cl. ................................. 126/332; 126/25 R; 126/9 R; 126/337 R; 126/41 R; 99/445; 99/425
[58] Field of Search ............... 126/41 R, 25 R, 29, 126/26, 9 R, 9 B, 39 H, 152 R, 332, 337 R; 99/445, 446, 448, 450, 425

[56] References Cited

U.S. PATENT DOCUMENTS

| | | | |
|---|---|---|---|
| 1,435,747 | 11/1922 | Seiling. | |
| 2,559,243 | 7/1951 | Brown | 126/9 |
| 2,817,331 | 12/1957 | Kaplan et al. | 126/41 R |
| 2,940,381 | 6/1960 | Cottongim et al. | 99/445 |
| 3,027,887 | 4/1962 | Krohncke | 126/25 R |
| 3,288,050 | 11/1966 | Saiki | 99/445 X |
| 3,330,204 | 7/1967 | Little | 99/339 |
| 3,937,138 | 2/1976 | Tidwell | 126/25 R X |
| 3,938,494 | 2/1976 | Clark | 126/41 R |
| 4,342,259 | 8/1982 | Lee | 126/41 R X |
| 4,428,281 | 1/1984 | Miller | 99/445 |
| 4,608,917 | 9/1986 | Faaborg | 99/340 |
| 4,646,711 | 3/1987 | Oliphant | 126/9 R |

*Primary Examiner*—Larry Jones
*Attorney, Agent, or Firm*—Heslin & Rothenberg

[57] ABSTRACT

A cooking grill designed to overlie a conventional outdoor barbecue is disclosed having a portable, unitary cooking surface that includes both a griddle section and a charbroil section to allow for the simultaneous and efficient frying and charbroiling of food over the barbecue. Preferably, depending arms are attached to the underside of the unitary cooking surface and are spaced to support the surface when removed from the barbecue such that the surface may be used to serve cooked food. The downwardly depending arms are also located and sized to prevent lateral movement of the cooking surface relative to the conventional barbecue when the surface overlies the barbecue. Additional features of the portable grill include an upwardly extending circumferential lip about each of the griddle section and the charbroil section to facilitate the retention of food on the cooking surface and a unique detachably connectable handle means for moving the cooking surface.

13 Claims, 5 Drawing Sheets

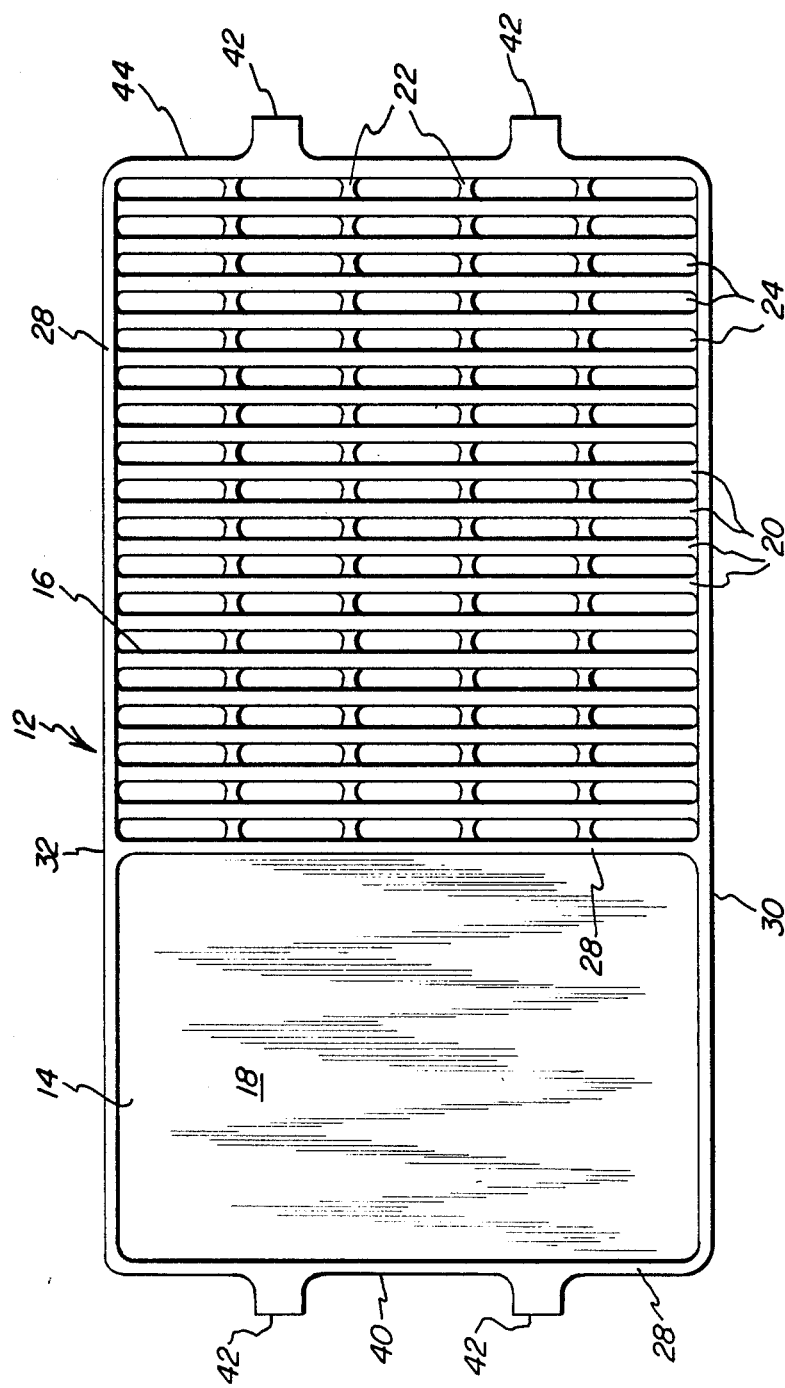

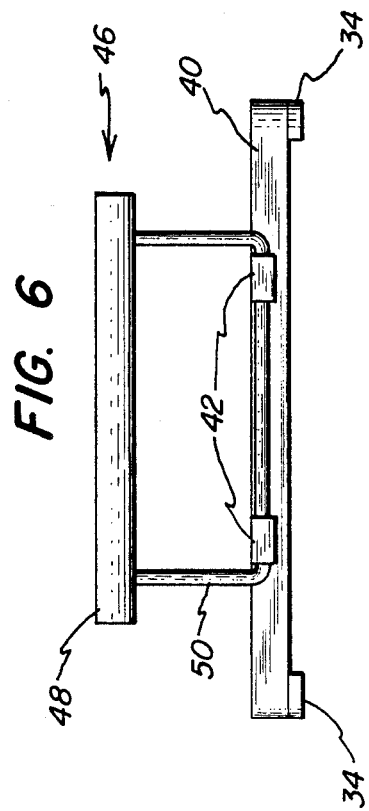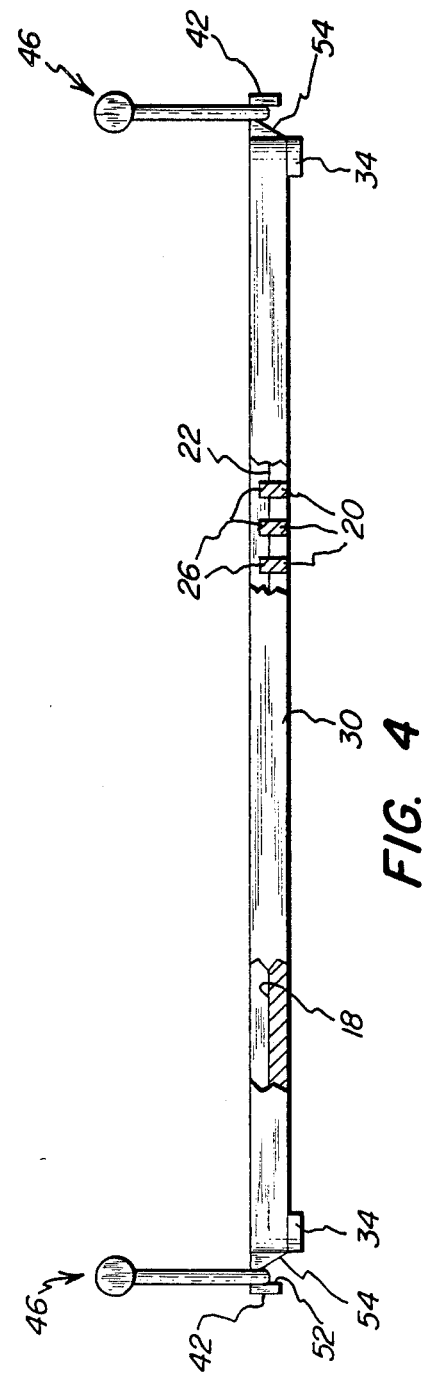

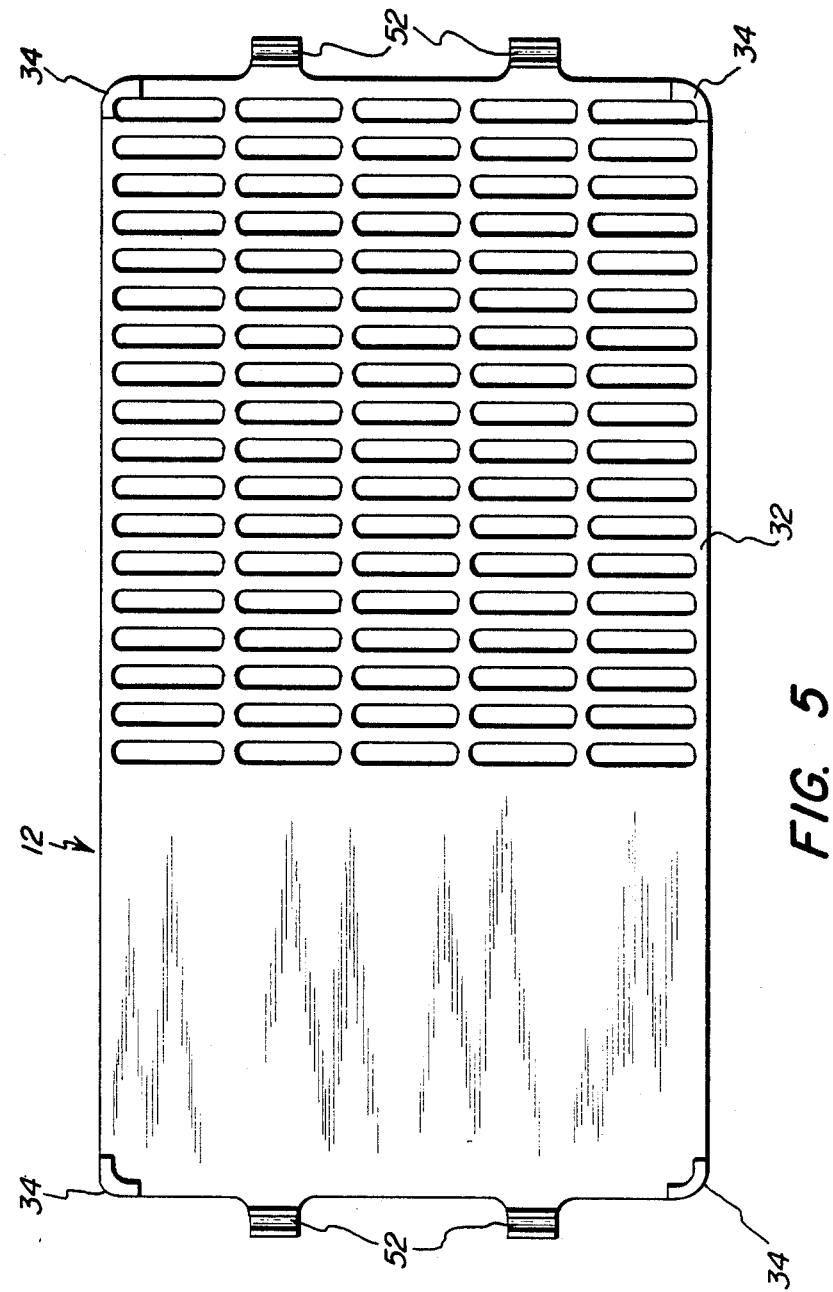

PORTABLE COMBINATION COOKING GRILL

BACKGROUND OF THE INVENTION

1. Field of the Invention

This invention relates to outdoor cooking apparatus, and more particularly, to a unique portable cooking grill designed to overlie a conventional outdoor barbecue. The portable grill has a unitary cooking surface that includes both a griddle section and a charbroil section to allow for the simultaneous and efficient frying and charbroiling of food over the barbecue.

2. Description of the Prior Art

As used herein, the terms "conventional barbecue" or "barbecue" include any outdoor cooking structure designed for use in barbecuing food. The term is intended to include both wood receiving fireplaces and charcoal receiving pedestal-type barbecues in addition to any other commercially available fixed or portable barbecue, such as a hibachi. Typically, the conventional barbecue has a grate or grill overlying a pit within which the heat source, such as wood or charcoal, is ignited.

Many barbecues have grills designed with a simple, widely spaced wire or bar construction for charbroiling food. The wide spacing is presumably designed to maximize the passage of smoke, heat and/or fire to the food. However, such a design not uncommonly results in a barbecuer losing food between the wires or bars into the heat source. To prevent food from falling through the grill, many barbecuers use foil between the food and grill; however, this approach is an obvious nuisance.

Another drawback to conventional barbecues is that the grill provided can only be used to charbroil food. If a person wishes to fry food then a separate pan must be used. Also, the grill of a conventional barbecue often deteriorates substantially as the result of prolonged exposure to the elements and repeated use over a number of years such that its cleanliness for cooking food is suspect. Lastly, because of their design most, if not all, conventional barbecue grills are incapable of subsequently functioning as a food server.

The prior art includes numerous outdoor cooking devices for various specialized purposes. The following U.S. patents are representative: 3,330,204; 4,608,917; 4,646,711; 4,428,281; 2,559,243; and 1,435,747. None of these references, however, describe a portable cooking grill that includes a unitary cooking surface having both griddle and charbroil sections and that is designed to overlie a conventional barbecue.

U.S. Pat. No. 3,330,204 describes a cooking device which includes a griddle and one or more separate racks which are capable of assembly in several ways to adapt an outdoor camp stove for use in griddle cooking, broiling, or toasting as desired. The disclosed cooking device includes multiple independent cooking sections and is designed specifically for a camp stove. The device clearly does not comprise a unitary grill designed to overlie a conventional barbecue to facilitate both the frying and charbroiling of food.

U.S. Pat. No. 4,608,917 describes a combination stovetop broiler and griddle structure which is adaptable to either broiling or grilling food upon selection of the appropriate assembly. The structure includes a grilling surface defined by a plurality of elongated small angles in parallel spaced relation which are welded to transverse support bars. A separate one piece griddle is substitutable for the grilling surface when desired. Again, the patent fails to describe a unitary grill designed to overlie a conventional barbecue for frying and/or charbroiling food, nor, if desired, a grill capable of conveniently functioning as a food server.

Thus, there continues to exist a geniune need for a portable, unitary combination cooking grill designed to overlie a conventional outdoor barbecue and facilitate the simultaneous and efficient frying and charbroiling of food over the barbecue, and the subsequent serving thereof.

SUMMARY OF THE INVENTION

Accordingly, a principal feature of the present invention is a portable unitary combination cooking surface sized to overlie a conventional barbecue. The cooking surface has both a griddle section and a charbroil section. The griddle section comprises a horizontally-extending solid surface for frying food and the charbroil section includes a plurality of ribs spaced substantially parallel to each other and a plurality of struts interconnecting the ribs. The spaced ribs and interconnecting struts define areas of perforation that allow the passage of smoke and flame but are specifically sized to inhibit the passage of food therethrough. Each of the ribs has a substantially flat top surface and the rib top surfaces together define a horizontally-extending surface for charbroiling food.

An enhanced feature of the invention comprises the addition of downwardly depending arms affixed to the underside of the unitary cooking surface which are designed to support the surface when removed from the conventional barbecue. Also, the downwardly depending arms are preferably located and sized so as to prevent lateral movement of the cooking surface relative to the conventional barbecue when the surface overlies the barbecue.

Additional features of the invention include an upwardly extending circumferential lip about each of the griddle section and the charbroil section to facilitate the retention of food on the cooking surface, and a unique detachably connectable handle means for moving the cooking surface.

A principal object of the present invention is to provide a portable unitary combination cooking grill specially designed to overlie a conventional outdoor barbecue.

Another object of the present invention is to provide such a cooking grill which includes a griddle section and a charbroil section for the simultaneous and efficient frying and charbroiling of food over the conventional barbecue.

Still another object of the present invention is to provide such a cooking grill which is selfsupporting when removed from the conventional barbecue and which includes positioning means for maintaining the lateral location of the grill relative to the conventional barbecue.

BRIEF DESCRIPTION OF THE DRAWINGS

These and other objects, advantages and features of the present invention will be more readily understood from the following detailed description of one preferred invention embodiment when considered in conjunction with the accompanying drawings in which:

FIG. 3 is a top plan view of the cooking surface embodiment of FIG. 1;

FIG. 4 is a partially cut-away side elevational view of the cooking grill of the present invention shown with detachable handles;

FIG. 5 is a bottom plan view of the cooking surface embodiment of FIG. 1; and

FIG. 6 is an end elevational view of the cooking grill of the present invention shown with the detachable handles.

DETAILED DESCRIPTION OF THE INVENTION

Figure 1:
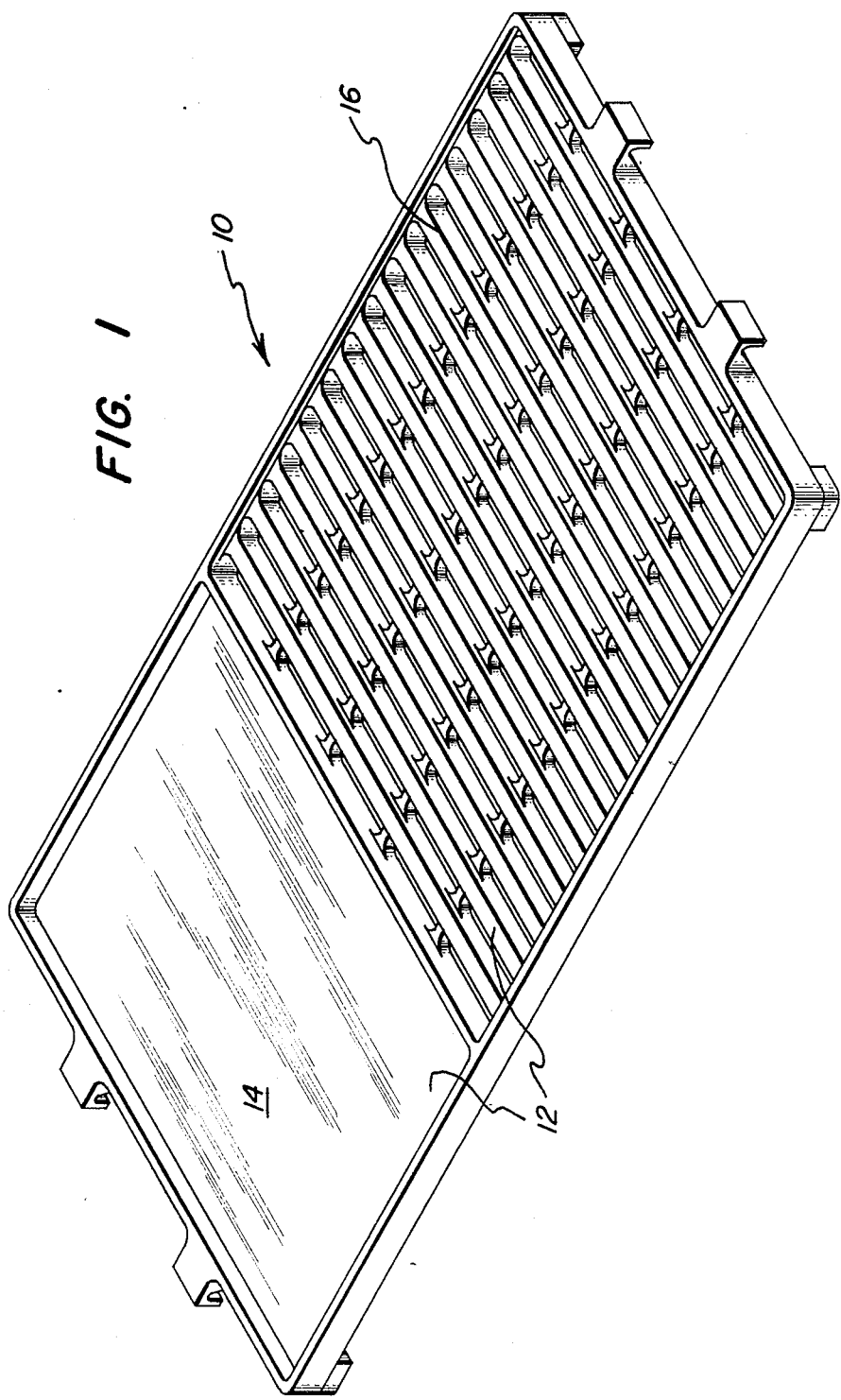
FIG. 1 is a perspective view of one embodiment of the portable combination cooking surface of the present invention.
Figure 2:
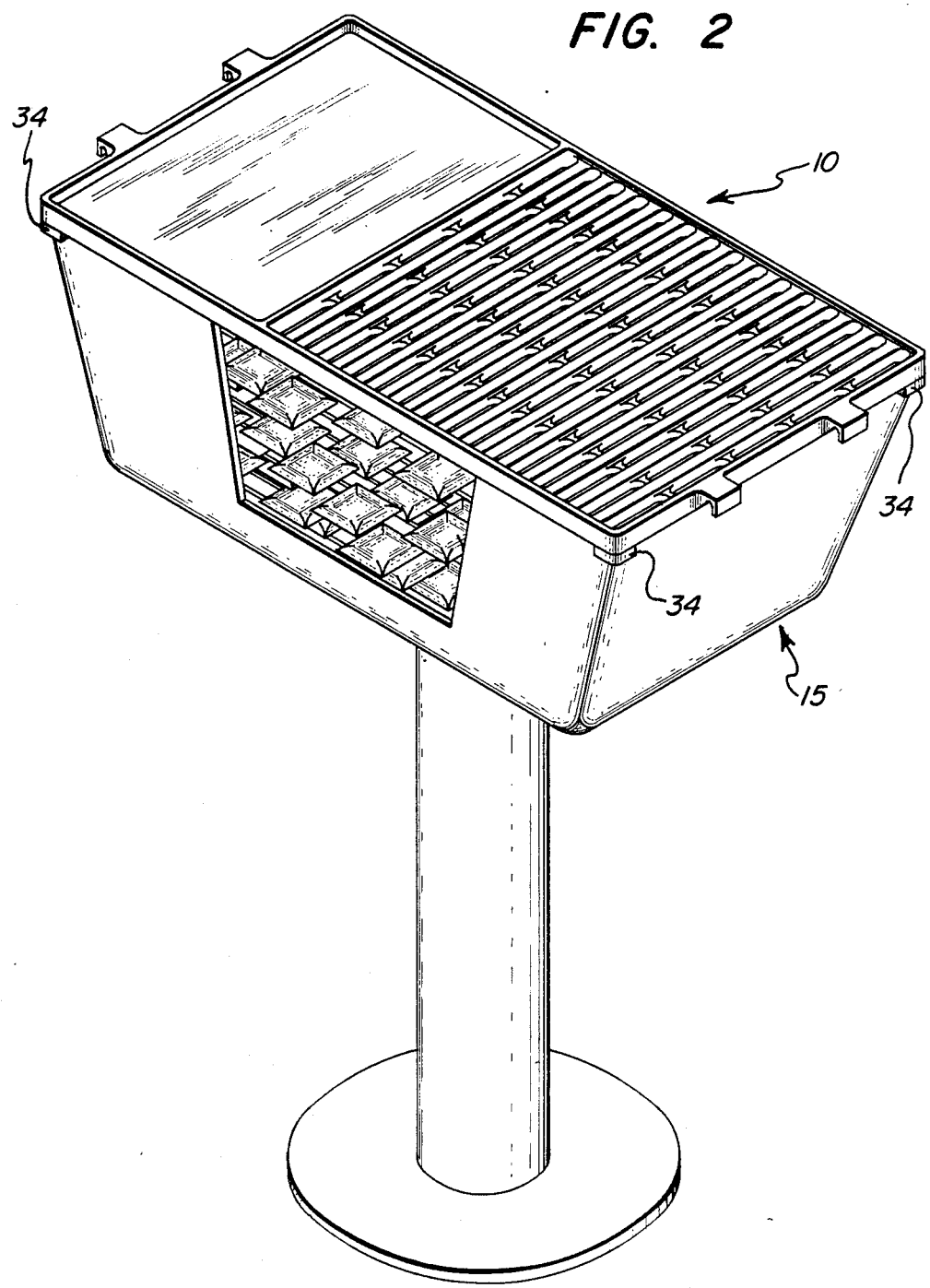
FIG. 2 is a perspective view of the cooking surface embodiment of FIG. 1 shown positioned atop a conventional pedestal-type barbecue.

One embodiment of the portable combination cooking grill of the present invention, generally denoted 10, is illustrated in and will be described with reference to FIGS. 1-6. As shown in FIG. 1, cooking grill 10 includes a unitary cooking surface 12 which has a griddle section 14 and a charbroil section 16. Although depicted as rectangular in shape, grill 10 may be configured of any desirable shape to overlie and conform to a particular type of conventional barbecue. As noted initially, the term "conventional barbecue" is used herein to include any outdoor cooking structure designed for broiling food, such as a fireplace, pedestal-type barbecue, hibachi, etc. Grill 10 is shown positioned over a conventional pedestal-type barbecue 15 in FIG. 2. Grill 10 is designed to either replace or overlie any existing grill or grate structure on the conventional barbecue. Thus, a user is ensured that his food cooking surface is clean and safe notwithstanding the condition of the barbecue's grill.

Referring to FIGS. 3 & 4, griddle section 14 is shown to comprise a horizontally-extending solid surface 18 for frying food over the conventional barbecue. Charbroil section 16 includes a plurality of ribs 20 spaced substantially parallel to each other and a plurality of struts 22 interconnecting the ribs 20 such that areas of perforation or holes 24 are defined. Perforations 24 allow the passage of smoke and/or fire to food being charbroiled on cooking surface 12. Preferably, perforations 24 are relatively small in size to inhibit the accidental passage of food therethrough.

Each rib 20 includes a substantially flat top surface 26. Surfaces 26 combine to form a horizontally-extending cooking surface for charbroiling food over the conventional barbecue. Ribs 20 are shown slightly raised above struts 22, which results in channels being formed which facilitate retention of frankfurters on section 16. Also, the reduced thickness of struts 22 serves to lower the overall weight of grill 10. In the rectangular-shaped embodiment illustrated, cooking surface 12 includes a first side 30 and an identical opposing side 32 (not shown). Preferably, a lip 28 is provided encircling both griddle section 14 and charbroil section 16 for preventing loss of food from cooking surface 12.

As illustrated in FIG. 5, cooking surface 12 has a substantially flat underside 32 which is believed to provide enhanced strength to grill 10. Preferably, grill 10 is die cast of aluminum, thereby creating a lightweight, easy to clean structure. However, it should be recognized that any known manufacturing means or manufacturing material could be utilized without departing from the scope of the present invention. Also as shown, a plurality of support arms 34 depend downwardly from underside 32 of surface 12. Support arms 34, preferably constructed to be unitary with surface 12, uphold cooking surface 12 when said surface is removed from the barbecue and placed on a level surface. This feature allows cooking surface 12 to be placed directly on a table immediately after removal from the barbecue, thus allowing the grill to also function as a hot serving tray. As illustrated, support arms 34 are arc-shaped and are located adjacent to the corners of cooking surface 12. This design and location of arms 34 is preferred so that the arms may function as lateral movement stops when grill 10 is positioned over the barbecue (see FIG. 2). Obviously, to accomplish this function, grill 10 must be appropriately sized for the particular barbecue with which it is used. Again, the rectangular shaped barbecue and grill 10 illustrated is considered exemplary only and various shape combinations can be utilized, e.g., circular, square, etc.

Referring to FIG. 6, the third side 40 of cooking surface 12 includes two outwardly extending finger structures 42, which are discussed further below. Opposing fourth side 44 (not shown) is identical to third side 40 and also includes two outwardly extending finger structures 42. Structures 42 are designed to detachably receive handle means 46. Preferably, two handle means are provided for removably engaging the structures 42 on opposing side surfaces of cooking surface 12 (see FIG. 4). In the embodiment illustrated, each handle means 46 comprises a cylindrical shaped hand grip 48 secured between the free ends of a U-shaped bar 50. Each finger structure 42 includes a downwardly facing channel or groove 52 (see FIG. 5) sized to receive bar 50 of handle means 46. As shown FIG. 4, angled lead-ins 54 are preferably provided on the downward facing surfaces of finger structures 42 to facilitate ready insertion of handle means 46 into grooves 52. In the embodiment illustrated, a single handle means simultaneously engages two finger structures for greater control when moving the cooking surface 12.

It will be observed from the above that the present invention fully meets the objectives set forth. A novel portable combination cooking grill is described for overlying a conventional outdoor barbecue. In addition, the combination grill includes a griddle section and a charbroil section for the simultaneous and efficient frying and charbroiling of food over the barbecue, and, if desired, the serving thereof. Lastly, such a cooking grill is provided which has self-supporting arms when removed from the conventional barbecue and which includes positioning means for maintaining the location of the grill relative to the barbecue when overlying the barbecue.

Although one embodiment of the cooking grill of the present invention has been illustrated in the accompanying drawings and described in the foregoing detailed description, it will be understood that the invention is not limited to the particular embodiment described herein, but is capable of numerous rearrangements, modifications and substitutions without departing from the scope of the invention. The following claims are intended to encompass all such modifications.

What is claimed is:

1. An improved portable combination cooking grill and server designed to removably rest upon a conventional outdoor barbecue when used as a grill, said combination grill and server comprising:

a portable unitary cooking surface sized to removably rest upon the conventional barbecue, said portable surface having a griddle section and a charbroil section;

said griddle section comprising a horizontally-extending solid surface for frying food;

said charbroil section including a plurality of ribs spaced substantially parallel to each other and a plurality of struts interconnecting said ribs, said plurality of spaced ribs and said plurality of interconnecting struts defining areas of perforation that allow the passage of smoke and flames but are sized sufficiently small to inhibit the passage of food therethrough, each of said ribs having a substantially flat top surface, said rib top surfaces defining a horizontally-extending surface for charbroiling food, whereby said portable cooking grill may be utilized to simultaneously and efficiently fry and charbroil food over a conventional barbecue; and detachable handle means capable of engaging said cooking surface for removing said surface from the conventional outdoor barbecue and for moving the combination grill and server to a location remote from the barbecue.

2. The portable combination cooking grill of claim 1, further comprising a plurality of downwardly depending arms affixed to the underside of said portable unitary cooking surface, said depending arms being located so as to support said grill in a horizontal position when removed from the barbecue and so as not to interfere with positioning of said cooking surface over the conventional barbecue.

3. The portable combination cooking grill of claim 2, wherein said downwardly depending arms are positioned and sized so as to prevent lateral movement of said cooking surface relative to the conventional barbecue when said surface is positioned overlying said barbecue.

4. The portable combination cooking grill of claim 3, wherein said downwardly depending arms are unitary with said cooking surface.

5. The portable combination cooking grill of claim 4, wherein said downwardly depending arms are arc-shaped in cross-section and short in depending length.

6. The portable combination grill of claim 5, wherein said grill includes a rectangular-shaped cooking surface and wherein said arc-shaped arms are located at the corners of said surface.

7. The portable combination cooking qrill of claim 1, wherein said cooking surface includes an upwardly extending circumferential lip about each of said griddle section and said charbroil section, said lip facilitating retention of food on said surface.

8. The portable combination cooking grill of claim 1, wherein said handle means automatically gravitationally detach from said surface when said means are not in use.

9. The portable combination cooking grill of claim 8, wherein said handle means includes:

at least two finger structures, said structures extending from opposing sides of said unitary cooking surface, each finger structure having a downwardly facing groove therein; and at least one lifting handle sized to engagably contact the finger structure within said downwardly facing groove when said lifting handle is positioned to move said unitary cooking surface.

10. The portable combination cooking grill of claim 9, wherein two finger structures extend from each of two opposing sides of said cooking surface, each of said finger structures having said downwardly facing groove therein, and wherein two lift handles are provided, each lift handle being sized to engagably reside within the grooves in the finger structures on one side of said cooking surface.

11. The portable combination cooking grill of claim 1, wherein said unitary cooking surface is sized and shaped to closely conform to the shape of the conventional barbecue, and wherein said griddle section comprises approximately one third of said cooking surface and said charbroil section comprises approximately two thirds of said cooking surface.

12. The portable combination cooking grill of claim 1, wherein said cooking surface is manufactured of die cast aluminum.

13. The portable combination cooking grill of claim 1, wherein said struts are positioned below the horizontallyextending surface defined by said ribs.

* * * * *